(12) United States Patent
Post et al.

(10) Patent No.: US 8,463,826 B2
(45) Date of Patent: Jun. 11, 2013

(54) INCREMENTAL GARBAGE COLLECTION FOR NON-VOLATILE MEMORIES

(75) Inventors: Daniel J. Post, Campbell, CA (US); Vadim Khmelnitsky, Foster City, CA (US); Nir J. Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 753 days.

(21) Appl. No.: 12/553,309

(22) Filed: Sep. 3, 2009

(65) Prior Publication Data

US 2011/0055455 A1    Mar. 3, 2011

(51) Int. Cl.
*G06F 12/00* (2006.01)
*G06F 17/30* (2006.01)

(52) U.S. Cl.
USPC .......................................... 707/820

(58) Field of Classification Search
None
See application file for complete search history.

(56) References Cited

U.S. PATENT DOCUMENTS

| 5,560,003 | A  | * | 9/1996  | Nilsen et al. ........................ 1/1 |
| 7,302,544 | B2 | * | 11/2007 | Chung et al. ................... 711/173 |
| 2005/0149686 | A1 | * | 7/2005  | Bacon et al. ................... 711/170 |
| 2010/0088482 | A1 | * | 4/2010  | Hinz ............................. 711/166 |

* cited by examiner

*Primary Examiner* — Uyen T. Le
(74) *Attorney, Agent, or Firm* — Van Court & Aldridge LLP

(57) ABSTRACT

Systems and methods are provided for performing incremental garbage collection for non-volatile memories ("NVMs"), such as flash memory. In some embodiments, an electronic device including the NVM may perform incremental garbage collection to free up and erase a programmed block of the NVM. The programmed block may include valid data and invalid data, and the electronic device may be configured to copy the valid data from the programmed block to an erased block in portions. In between programming each portion of the valid data to the erased block, the electronic device can program host data to the erased block. This way, the electronic device can stagger the garbage collection operations and prevent a user from having to experience one long garbage collection operation.

25 Claims, 6 Drawing Sheets

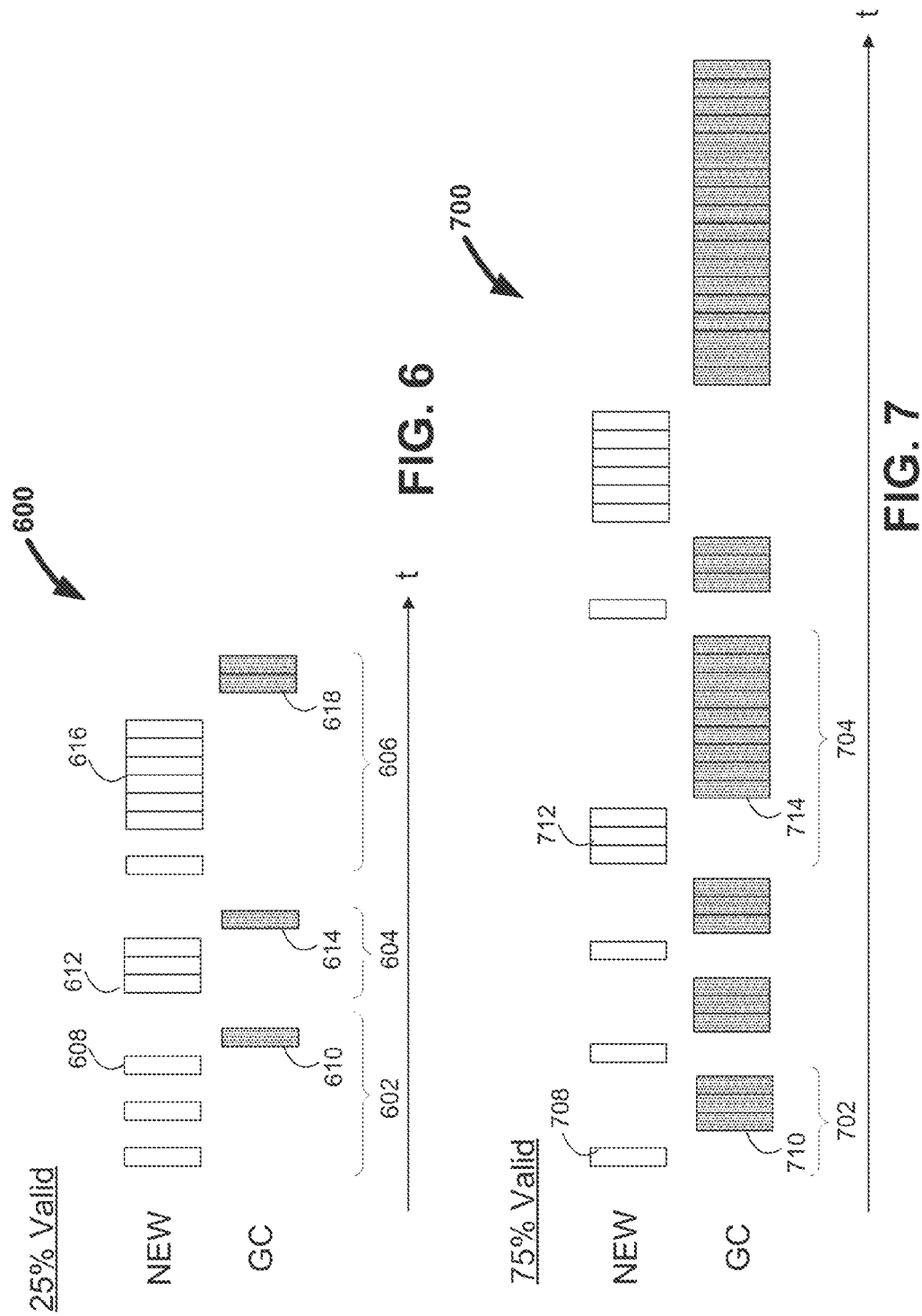

INCREMENTAL GARBAGE COLLECTION FOR NON-VOLATILE MEMORIES

FIELD OF THE INVENTION

This can relate to systems and methods for performing incremental garbage collection for non-volatile memories, such as flash memories.

BACKGROUND OF THE DISCLOSURE

NAND flash memory, as well as other types of non-volatile memories ("NVMs"), are commonly used in electronic devices for mass storage. For example, consumer electronics such as portable media players often include flash memory to store music, videos, and other media.

Some non-volatile memories, however, are configured such that a block of programmed memory locations needs to be erased before any of the memory locations in the block can be reprogrammed. Therefore, electronic devices typically perform an operation referred to as "garbage collection" ("GC") to free up blocks for erasing and reprogramming. In particular, a block may include both data that is needed by the electronic device (i.e., "valid data" or "current data") and data that is no longer needed by the electronic device (i.e., "invalid data" or "obsolete data"). To free up all of the memory locations in that block for erasing, the electronic device may copy the block's valid data into memory locations of another block.

An electronic device typically begins garbage collection when the electronic device runs low on erased blocks. Garbage collection may be a time-consuming process, causing the electronic device to be tied up for a substantial amount of time until a sufficient number of blocks are freed and erased. This may be frustrating for the user, who may want to use the electronic device's processing resources to perform other activities.

SUMMARY OF THE DISCLOSURE

Accordingly, systems and methods are disclosed for performing garbage collection ("GC") incrementally. In this way, the need for long periods of extended garbage collection operations may be avoided to a substantial degree.

In some embodiments, an electronic device is provided that may include a system-on-a-chip and a non-volatile memory (NVM). The NVM may include flash memory, such as NAND flash memory, or any other suitable type of non-volatile memory that may be blockwise eraseable.

The system-on-a-chip can include a NVM interface, sometimes referred to herein as a "memory interface," for accessing the NVM. The memory interface may include a translation layer, such as flash translation layer ("FTL"). The translation layer may be configured to handle write requests to write new user data to the NVM. The write requests may be received from a file system or host, for example.

The memory interface, via the translation layer, may further be configured to perform garbage collection to free up programmed blocks for erasing. For example, the memory interface may select a programmed block having the smallest amount of valid data as the first programmed block to free up for erasing. In some embodiments, the memory interface may perform conventional garbage collection when the number of erased blocks in the NVM falls below a first minimum threshold, and may perform incremental garbage collection when the number of erased blocks falls to a level close the first minimum threshold (e.g., falls below a second threshold greater than the first minimum threshold). Thus, the memory interface can enable incremental garbage collection to avoid, as much as possible, scenarios when conventional garbage collection becomes necessary.

In some embodiments, incremental garbage collection can involve the memory interface copying or replicating valid data from a programmed block (e.g., the programmed block with the smallest amount of valid data) to an erased block in portions. Between programming each portion of the valid data, the memory interface may program new user data received from a file system or host. For example, the memory interface may alternate between performing at least one host programming operation to store new user data and performing at least one garbage collection programming operation to copy a portion of the programmed block's valid data. By spacing out the GC programming operations between host programming operations, the amount of time it takes to perform garbage collection may not feel as pronounced or be as inconvenient to the user of the electronic device.

To space out the garbage collection programming operations, the memory interface may program both new user data and a portion of a programmed block's valid data in response to receiving a write request. In other words, for some or all received write requests from a file system or host, the memory interface may program not only the new user data received with the write request, but also a portion of the valid data for garbage collection purposes. This way, as an erased block is being filled, the memory interface can ensure that the erased block is filled with a suitable amount of garbage collected data.

The memory interface may copy the portion of valid data from a programmed block to an erased block based on the initial proportion of valid data in the programmed block. The initial proportion may be, for example, the percentage of memory locations in the programmed block that store valid data (as opposed to obsolete, invalidated data) or the ratio of valid data compared to invalid data in the programmed block.

The portion of the valid data copied to an erased block may be based further on the size of the new user data received from a file system or host, for example. Using the initial proportion and the size of the new user data, for example, the memory interface may select the size of the portion to copy over, or the memory interface may determine whether to copy over a portion of valid data responsive to a current write request. For example, if 25% of a programmed block includes valid data and 75% includes invalid data, the memory interface may be configured to program one page worth of the valid data each time three pages worth of new user data is received from the file system or host. Thus, in some embodiments, the amount of valid data copied from a programmed block may be chosen such that the ratio of stored new user data to copied valid data is inversely proportional to the ratio of the amount of valid data to invalid data initially stored in the programmed block.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 6 and 7 are illustrative timing diagrams of program operations issued by a memory interface to perform incremental garbage collection for a non-volatile memory in accordance with various embodiments of the invention.

DETAILED DESCRIPTION OF THE DISCLOSURE

Figure 1:
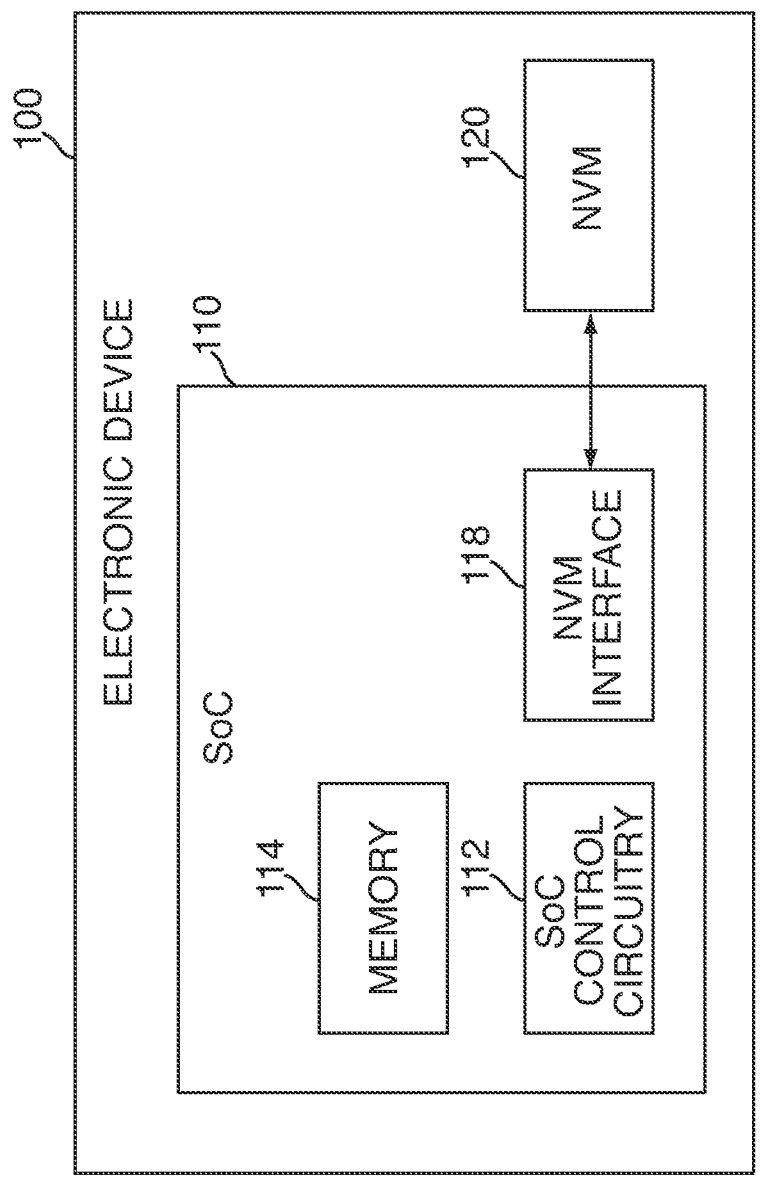
FIG. 1 is a schematic view of an electronic device configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof.

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

NVM 120 can include multiple integrated circuit ("IC") die. Each IC die can include multiple "blocks," where the memory locations in each block may be erased in a single erase operation. The block from corresponding positions along each die (e.g., blocks having the same position or block number) may form units referred to as "super blocks." Each block may be organized into multiple "pages" that may each be programmable and readable at once. Each memory location of NVM 120 (e.g., a page or block) can be addressed using a physical address (e.g., a physical page address or physical block address). While electronic device 100 is illustrated as having only one NVM 120 package, it should be understood that multiple packages of non-volatile memories may be included in electronic device 100.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "host data" or "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include any suitable hardware components (e.g., application-specific integrated circuits ("ASICs"), one or more processors that operate under the control of software/firmware stored in NVM 120 or memory 114, or any combination thereof.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, die, packages, etc.) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor referred to as being part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as a host controller for the target device. For example, as the host controller, SoC 110 can issue read and write requests to the target device.

Figure 2:
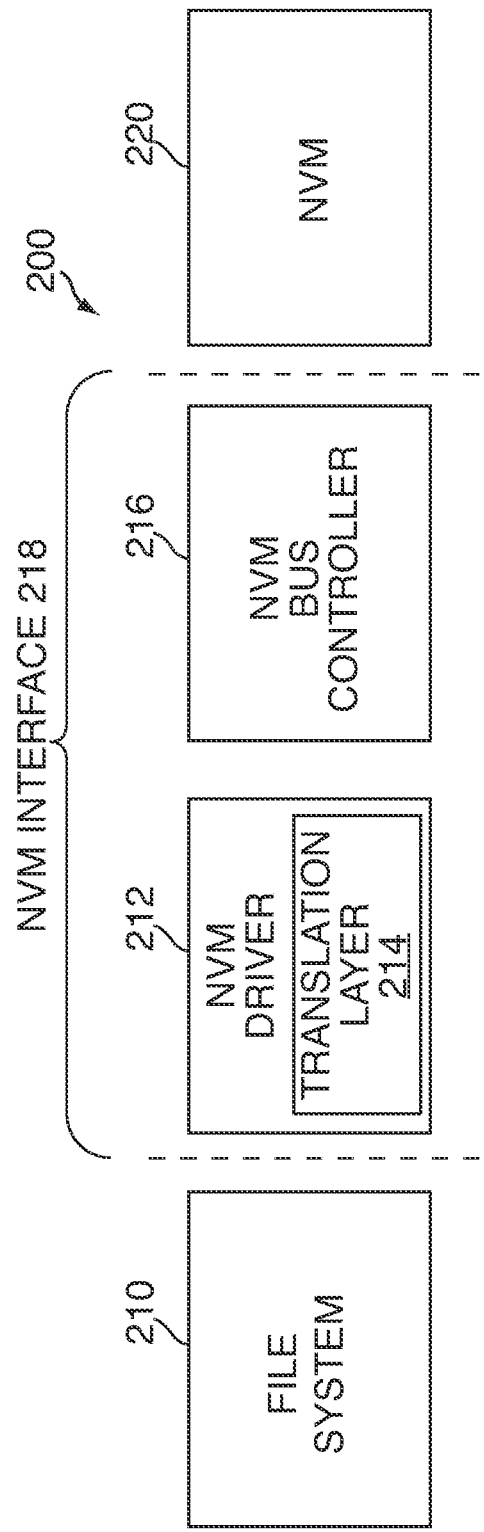
FIG. 2 is a schematic layered view of an electronic device configured in accordance with various embodiments of the invention.

FIG. 2 is a schematic layered view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may include software and/or firmware modules, and NVM bus controller 216 and NVM 220 may include hardware modules. Accordingly, in these embodiments, NVM driver 212 may embody the software or firmware aspect of NVM interface 218, and NVM bus controller 216 may embody the hardware aspects of NVM interface 218.

File system 210 can include any suitable type of file system, such as a File Allocation Table ("FAT") file system, and may be part of the operating system of electronic device 200 (e.g., part of SoC control circuitry 112 of FIG. 1). In some embodiments, file system 210 may include a flash file system, such as a flash file system with the same or similar features as Yet Another Flash File System ("YAFFS"). In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read or stored. Along with each read or write command, file system 210 can provide a logical address to indicate where the user data should be read from or written to, such as a logical page address or a logical block address with a page offset.

NVM driver 212 may receive and handle the read and write requests from file system 210 in a memory-specific and/or vendor-specific manner suitable for NVM 220. NVM driver 212 may include translation layer 214, which may include a flash translation layer, for managing the memory locations of NVM 220 (e.g., performing wear leveling, garbage collection (discussed below), handling memory accesses, etc.). On a write request from file system 210, translation layer 214 may map a provided logical address to a free physical address (i.e., corresponding to an erased memory location) at which the user data may be stored. On a read request from file system 210, translation layer 214 may determine, from the provided logical address, the physical address at which the current version of the requested data is stored. To complete the read and write requests, NVM driver 212 may interface with NVM bus controller 216, which may be configured to access NVM 220 using the bus protocols, data rate, and other specifications of NVM 220.

Translation layer 214 may convert between logical and physical addresses because NVM 220 may not be write-in-place. That is, even if file system 210 issues two write requests to the same logical address, NVM driver 212 may not be able to program the user data to the same physical address (nor would it be advantageous to do so in many scenarios). This is because NVM driver 212 may need to program user data into memory locations that are in an erased state (as opposed to a programmed state). Therefore, at any point during operation of electronic device 200, multiple memory locations in NVM 220 may be programmed with user data associated with the same logical address. One of these memory locations may include user data from the most recent write request, and may therefore be the valid version of the user data for that logical address, referred to sometimes as "valid data" or "current data." The other memory locations may include user data corresponding to older write requests, and therefore these memory locations store "invalid data" or "obsolete data" that may no longer be needed by electronic device 200.

Translation layer 214 may initiate garbage collection ("GC") to free up a programmed block of NVM 220 for erasing. Once freed and erased, the memory locations can be used to store new user data received from file system 210, for example. NVM 220 may be blockwise eraseable, so that all of the memory locations in a programmed block are erased in the same erase operation. Because a programmed block containing invalid data may also contain valid data, the garbage collection process may involve copying the valid data from the programmed block to another block having erased memory locations, thereby invalidating the valid data in the programmed block. Once all of the memory locations in the programmed block have been invalidated, translation layer 214 may direct bus controller 216 to perform an erase operation on the programmed block.

Accordingly, NVM interface 218 may perform at least two general types of programming operations: a first type to program new user data received from file system 210 into NVM 220 and another type to program valid data read from a programmed block into another block of NVM 220 for garbage collection purposes. For clarity, the first type of programming operation may be referred to sometimes as a "host programming" or "host write" operation, and the second type of programming operation may sometimes be referred to as a "GC programming" or "GC write" operation. Also, the garbage collection step of copying current data from a programmed block in order to invalidate the current data may be referred to sometimes as "freeing up" the programmed block.

In some operating scenarios, translation layer 214 may perform garbage collection using a conventional approach. For example, translation layer 214 may determine when a die of NVM 220 contains below a predetermined threshold of erased blocks. Responsive thereto, translation layer 214 may free up and erase blocks in the die until a suitable predetermined number of blocks are in an erased state or freed up for erasing. This type of garbage collection, referred to sometimes herein as "full-on garbage collection," may involve a large number of GC programming and erase operations, and may therefore consume the processing resources of electronic device 200 for a substantial period of time. Moreover, a host write of a small amount of user data can trigger the full-on garbage collection process if the die of NVM 220 is already close to the minimum threshold of erased blocks. When this occurs, a user may be frustrated that a seemingly small write operation can cause such a substantial hold-up in the processing resources. Accordingly, various embodiments described herein provide incremental garbage collection techniques that lessen the times when full-on garbage collection may be performed.

Figure 3:
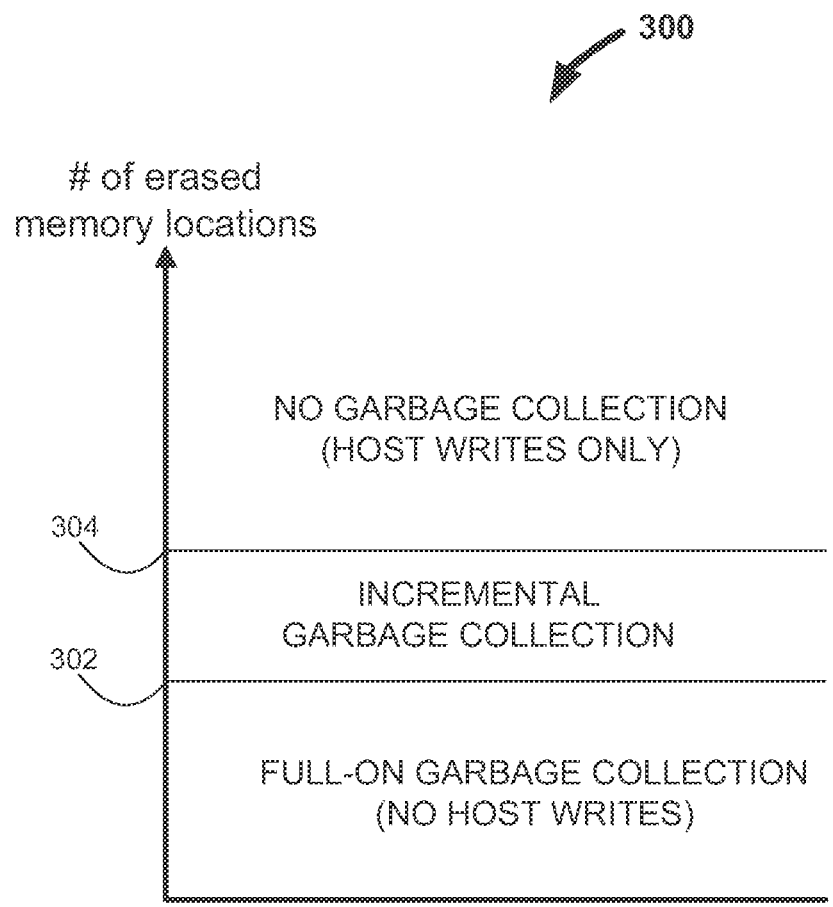
FIG. 3 is a graph illustrating scenarios when garbage collection may be initiated in accordance with various embodiments of the invention.

FIG. 3 shows an illustrative graph 300, which provides scenarios when full-on and incremental garbage collection may be performed by NVM interface 218. The vertical axis of graph 300 may represent the number of memory locations in a die of NVM 220 that are in an erased state. NVM interface 218 may determine when the number of erased memory locations in an IC die falls below a first predetermined threshold 302. Responsive thereto, NVM interface 218 may initiate full-on garbage collection to free up and erase some of the programmed blocks. NVM interface 218 may perform full-on garbage collection until a predetermined number of programmed blocks are freed and erased or until the number of erased memory locations rises to some suitable level above first threshold 302.

To avoid scenarios when the number of erased memory locations falls below first threshold 302, NVM interface 218 may determine when the number of erased memory locations approaches, but still remains above, first threshold 302. These may be the scenarios where the die of NVM 220 is most at risk of falling below first threshold 302. In particular, NVM interface 218 may determine when the number of erased memory locations falls below a second threshold 304, which may be any suitable value above first threshold 302. Responsive thereto, NVM interface 218 may enable incremental garbage collection using any of the techniques described below, which may keep the number of erased memory locations above first threshold level 302. In response to determining that the number of erased memory locations is above second threshold 304, the die of NVM 220 may not yet be at risk of needing full-on garbage collection, and NVM interface 218 may perform only host programming operations to program new user data from file system 210 to the die of NVM 220.

It should be understood that graph 300 is merely illustrative. In particular, the positions of first threshold 302 and second threshold 304 along the vertical axis are merely illustrative and can each be any suitable number. The positions of first threshold 302 and second threshold 304, for example, may be based on the size of each IC die in NVM 220 and/or the vendor of NVM 220.

Figure 5:
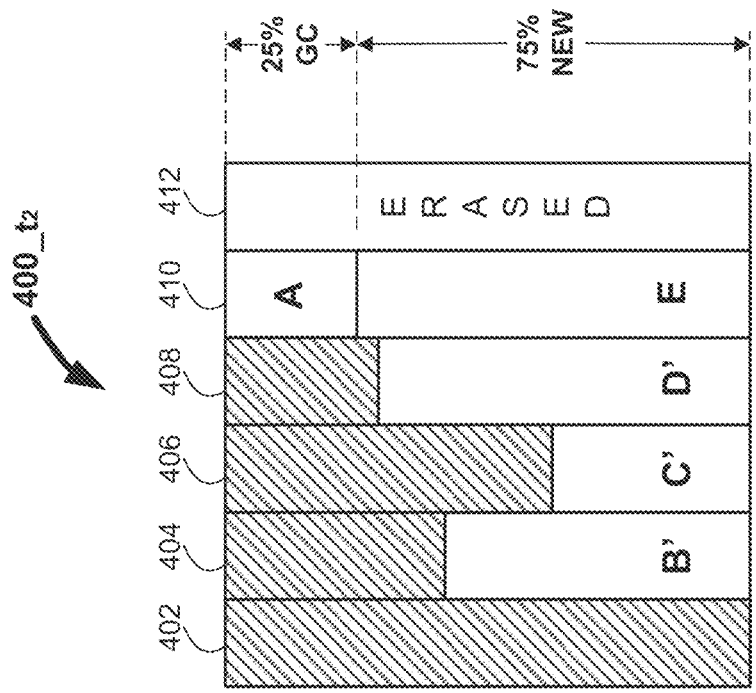
FIGS. 4 and 5 are a graphical view of valid and invalid data stored in a non-volatile memory at two points in time during garbage collection in accordance with various embodiments of the invention.
Figure 4:
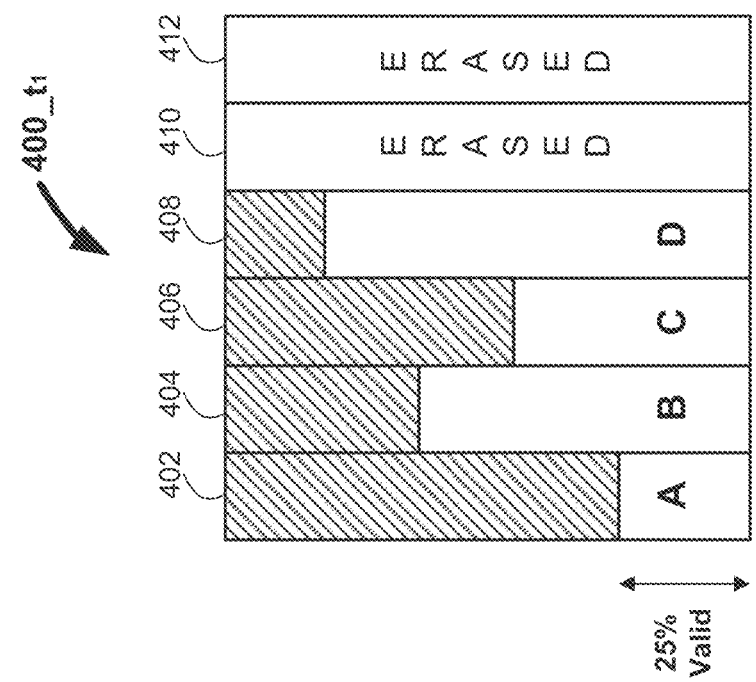

Referring now to FIGS. 4 and 5, graphical views of die 400 are shown at a first time $t_1$ and a second time $t_2$, respectively. Die 400 may be an IC die of NVM 220 (FIG. 2) and may include at least six blocks 402, 404, 406, 408, 410 and 412. At a time $t_1$ (FIG. 4), four of the blocks may be in a programmed state (e.g., blocks 402, 404, 406, and 408), and two of the blocks may be in an erased state (e.g., blocks 410 and 412). To reach this state, NVM interface 218 may have a programming order such that data is programmed first into block 402, then into block 404, and so on. FIG. 4 may therefore illustrate a time $t_1$ when NVM interface 218 has just finished programming data into block 408 and is ready to program any additional data into block 410.

As programmed blocks, blocks 402, 404, 406, and 408 may include a number of memory locations (e.g., pages) that store data. The stored data may be valid or invalid. The shaded portion of each programmed block represents the invalid data and the un-shaded portion of each programmed block represents the valid data. For simplicity, the valid data stored in blocks 402, 404, 406, and 410 may be referred to as valid data A, B, C, and D, respectively.

It should be understood that the shading within blocks 402, 404, 406, and 408 is intended only to illustrate the proportion of memory locations in each block that store valid data (e.g., 25% in block 402), but not which memory locations store valid data or invalid data. Thus, it should be understood that the valid data and invalid data in blocks 402, 404, 406, and 408 may actually be interspersed within the memory locations of block 402.

In the example of FIGS. 4 and 5, NVM interface 218 may initiate full-on garbage collection when the number of erased blocks falls to one, and NVM interface 218 may initiate incremental garbage collection when the number of erased blocks falls between one and at least two. That is, referring briefly back to FIG. 3, the first threshold 302 may be one erased block, and the second threshold 304 may be at least two erased blocks (e.g., 2, 2.5, or 3 erased blocks). Thus, because die 400 includes only two erased blocks 410 and 412 in FIG. 4, at time $t_1$, NVM interface 218 may determine that die 400 is between first threshold 302 and second threshold 304, and, responsive thereto, may initiate incremental garbage collection.

NVM interface 218 may initiate incremental garbage collection to avoid reaching the threshold for performing full-on garbage collection. To do this, NVM interface 218 may program data into block 410 such that one of the programmed blocks (i.e., block 402, 404, 406, or 408) is completely freed up and ready to be erased by the time block 410 is fully programmed.

NVM interface 218 may select the block with the smallest amount or proportion of valid data as the block to completely free up when filling up block 410. In the example of FIG. 4, NVM interface 218 may select block 402, which includes 25% valid data. This is because valid data A would not take up as many memory locations in block 410 as valid data B, C, or D, thereby leaving a maximal number of memory locations available in block 410 for storing new user data provided from file system 210. For simplicity and clarity, a programmed block with a smallest amount of valid data, which may be selected as the block to free up for GC purposes, may sometimes be referred to as a "GC block."

FIG. 5 is a graphical view of die 400 at a time $t_2$ after block 410 has been fully programmed. Since block 402 may be chosen as the GC block, NVM interface 218 may perform a suitable number of GC programming operations between time $t_1$ and time $t_2$ to copy all of valid data A into block 410. The remaining memory locations in block 410 can be used to store valid data E, which NVM interface 218 may store by performing host program operations responsive to write requests from file system 210. Because all of valid data A may be copied to block 410 by time $t_2$, block 402 may be completely freed up and ready to be erased by the time NVM interface 218 is ready to program data into block 412 at time $t_2$. Thus, with block 402 erased, the number of erased blocks in die 400 may remain above the threshold of one block that would otherwise cause NVM interface 218 to perform full-on garbage collection. At this time, NVM interface 218 may select another programmed block to perform incremental garbage collection on, such as block 406.

FIG. 5 illustrates die 400 in a worst case scenario, where none of the host programming operations to store valid data E invalidates any of valid data A in block 402 (FIG. 4). Some or all of the host programming operations may instead invalidate parts of valid data B, C, and D, and/or may correspond to previously unused logical addresses. Because none of valid data A in GC block 402 is invalidated from the host programming operations in this worst case scenario, all of valid data A may need to be copied to block 410 via GC programming operations in order to completely invalidate block 402 by the time block 410 is fully programmed.

To avoid having to perform full-on garbage collection, NVM interface 218 may operate under the assumption that the worst case scenario may occur, and therefore 25% of block 410 may be reserved for garbage collected data, if necessary. Thus, when programming data into block 410, NVM interface 218 may distribute GC and host programming operations such that the ratio of new user data to copied valid data stored in block 410 is inversely proportional to the ratio of valid data to invalid data in the GC block (e.g., three-to-one for block 402 in this example). More generally, NVM interface 218 may perform incremental garbage collection based on the amount or proportion of valid data in the programmed block with the smallest proportion of valid data.

As with the other programmed blocks, the illustration of block 410 in FIG. 5 is intended only to show the relative amount of new user data (i.e., valid data E) compared to garbage collected data (i.e., valid data A, sometimes referred to as "GC data") stored in block 410, and is not intended to show which memory locations (e.g., pages) of block 410 store new user data and which store GC data. Rather, NVM interface 218 may perform multiple GC programming operations to copy valid data A from GC block 402 to block 410, where each GC programming operation may copy over a portion of valid data A. In between each such GC programming operation, NVM interface 218 may perform one or more host writes to block 410. Valid data A may, therefore, be copied from block 402 to block 410 portion by portion and interspersed between programming portions of valid data E. By spreading out the GC write operations in this manner, no single GC write operation may appear to a user to take a substantial and frustrating amount of time to complete.

It should be understood that FIGS. 4 and 5 are merely illustrative. FIGS. 4 and 5 are intended only as an example of how NVM interface 218 may operate given FIG. 4 as an initial condition and given the occurrence of a "worst case scenario" discussed above in connection with FIG. 5. It should be understood that NVM interface 218 may face other initial conditions that may change the way in which NVM interface 218 performs incremental garbage collection.

For example, in some scenarios, NVM interface 218 may initiate incremental garbage collection when there are still erased memory locations remaining in block 408 (as opposed to block 408 being completely programmed). In these scenarios, some portions of valid data A may be copied into the remaining erased memory locations in block 408, and other portions of valid data A may be copied into block 410, as discussed above.

As another example, in some scenarios, block 410 may be partially programmed when incremental garbage collection is initiated (instead of being completely erased, as in FIG. 4). In these scenarios, NVM interface 218 may distribute GC and host programming operations based on both the amount of remaining space in block 410 and the initial proportion of valid data in block 402 (FIG. 4). For example, if block 410 is 50% full when incremental garbage collection is initiated and block 402 has 25% of its memory locations storing valid data, NVM interface 218 may be configured to fill the remainder of block 410 at a one-to-one ratio between new user data and garbage collected data.

Referring now to FIGS. 6 and 7, illustrative timing diagrams 600 and 700 are provided, which can illustrate how NVM interface 218 may distribute host and GC programming operations over time during incremental garbage collection. Each timing diagram is separated into two rows for clarity, although both may be performed by NVM interface 218. The top row may illustrate host programming operations performed by NVM interface 218 to store new user data received from file system 210 in an erased block. The bottom row may illustrate GC programming operations performed by NVM interface 218 to copy valid data from a GC block to the erased block (e.g., valid data A from block 402 (FIG. 4)).

Referring first to FIG. 6, timing diagram 600 may illustrate the programming operations performed by NVM interface 218 in scenarios similar to the example of FIGS. 4 and 5 (i.e., where the programmed block with the smallest proportion of valid data has 25% of its memory locations storing valid data). Thus, for simplicity and clarity, timing diagram 600 may be described with continued reference to the examples of FIGS. 4 and 5. In particular, the programming operations may illustrate a process of programming data into block 410 of FIGS. 4 and 5.

Because 25% of the memory locations in block 410 may be reserved for GC data (e.g., valid data A), NVM interface 218 may be configured to program one page of GC data for every three pages of new user data that is programmed. To maintain this one-to-three host-to-GC ratio as block 410 is being filled, NVM interface 218 may alternate between performing host writes and GC writes. In particular, NVM interface 218 may perform multiple memory access iterations 602, 604, and 606. Each of the memory access iterations may include at least one host programming operation to program new user data into block 410 and at least one GC programming operation to program a portion of valid data A into block 410 at a ratio of or approximately equal to three pages of new user data to one page of GC data.

For example, looking first to memory access iteration 602, NVM interface 218 may receive three write requests from file system 210 before three pages worth of new user data is received. In response to the third write request, NVM interface 218 may perform both a host write to program new user data 608 to block 410 and a GC write to program GC data 610 (e.g., a portion of valid data A) to block 410. By programming one page of valid data A to block 410 after the third page of new user data is received, NVM interface 218 may maintain the three-to-one ratio within the first memory access iteration 602 and may complete first memory access iteration 602.

In some cases, NVM interface 218 may receive multiple pages worth of data in a single write request. For example, the second memory access iteration 604 may begin with NVM interface 218 receiving three pages worth of new user data from a single write request. Responsive thereto, NVM interface 218 may perform a host programming operation to program new user data 612 and a GC programming operation to program GC data 614. As with first memory access iteration 602, second memory access iteration 604 may maintain the three-to-one ratio of host-to-GC data stored in block 410.

In some cases, NVM interface 218 may receive write requests with even larger amounts of new user data than three pages. The new user data may be large enough that more than one page of GC data may be stored in a memory access iteration in order to maintain the three-to-one ratio of new-to-GC data stored in that memory access iteration. For example, during third memory access iteration 606, NVM interface 218 may receive a write request with new user data 616, which may include six pages worth of data (for a total of seven pages of new user data in memory access iteration 606). In response to receiving the write request with new user data 616, NVM interface 218 may store both new user data 616 and GC data 618. GC data 618, stored via a GC programming operation, may include two pages worth of GC data (e.g., of valid data A). This may allow NVM interface 218 to maintain the three-to-one ratio of new user data-to-GC data as much as possible considering the circumstances.

In some embodiments, to make up for the imperfect three-to-one ratio in memory access iteration 606, the next memory access iteration may involve NVM interface 218 waiting to receive only two more pages of new user data before programming another page of GC data into block 410. Alternatively, NVM interface 218 may not program GC data 618 during memory access iteration 606, and may instead wait until NVM interface 218 can program X*3 pages of new user data into block 410 before programming X pages of GC data. In still other embodiments, NVM interface 218 may program GC data 618 or three pages worth of GC data in memory access iteration 606, and NVM interface 218 may continue onto the next memory access iteration without trying to make up for the imperfect three-to-one ratio.

FIG. 7 provides timing diagram 700, which illustrates the host and GC programming operations that NVM interface 218 may perform when the initial proportion of valid data in the GC block is 75%, and therefore 75% of an erased block may be reserved for copying over valid data. In particular, timing diagram 700 illustrates the memory access iterations that NVM interface 218 may perform in response to receiving the same write requests as those of FIG. 6.

Because, in the scenario of FIG. 7, an erased block may need to reserve 75% of its memory locations for GC data, NVM interface 218 may program three pages of GC data for every one page of new user data that is programmed in each memory access iteration. To do this, NVM interface 218 may select the amount of GC data to program responsive to a write request by multiplying the size of the new user data received from the write request by three. For example, during first memory access iteration 702, in response to receiving the first write request with new user data 708, NVM interface 218 may program one page of new user data 708 and three pages of GC data 710 to an erased block NVM 220. Later in memory access iteration 704, in response to receiving a write request to store new user data 712, NVM interface 218 may program the three pages of new user data 704 and nine pages of GC data 714 to the erased block. This way, even though the size of the new user data from a write request may vary, NVM interface 218 can maintain the one-to-three ratio of new-to-GC data stored during each memory access iteration.

Thus, at least some of the write requests in FIG. 6 (when the proportion of valid data is less than 50%) and all of the write requests in FIG. 7 (when the proportion of valid data is greater than 50%) may lead NVM interface 218 to program not only the new user data received from the write request, but also GC data. Because of the extra data that is programmed, the user may encounter slower write times during incremental garbage collection than during normal operation. The decrease in speed may be based on the initial proportion of valid data in the GC block, for example. While a user may dislike experiencing the slower write times, this type of delay may be much less frustrating to a user than the substantial delays that the user would have otherwise had to face during a full GC operation.

Timing diagrams 600 and 700 illustrate the programming operations of NVM interface 218 when the number of erased blocks continues to fall within the thresholds for performing incremental garbage collection (e.g., between first threshold 302 and second threshold 304 of FIG. 3). In some operating scenarios, NVM interface 218 may receive delete requests to delete data from NVM 220, which may allow NVM interface 218 to invalidate one or more blocks of a die (e.g., die 400). Thus, in response to some delete requests, NVM interface 218 may terminate the memory access iterations and resume normal operations. In other operating conditions, NVM interface 218 may receive a large write request, which may cause the number of erased memory locations to fall below the threshold for performing full-on GC (e.g., first threshold 302). In these operating scenarios, NVM interface 218 may terminate the memory access iterations in favor of performing only GC programming operations.

It should be understood that the timing diagrams of FIGS. 6 and 7 are merely illustrative and that the appropriate ratio of host writes to GC writes may be achieved using any other suitable approach. For example, in some embodiments, in response to receiving a write request, NVM interface 218 may perform the GC programming operation first instead of the host programming operation. Thus, it should be understood that any approach that allows NVM interface 218 to copy the valid data from a GC block portion-by-portion and in between host programming operations falls within the scope of the invention.

Also, while FIGS. 6 and 7 were described in terms of NVM interface 218 programming a page or multiple pages of host or GC data, it should be understood that each unit shown in FIGS. 6 and 7 may actually represent more than a page. For example, to maintain the three-to-one ratio of new-to-GC data in FIG. 6, NVM interface 218 may wait until six pages of new user data is received from file system 210 before programming two pages of GC data.

Figure 8:
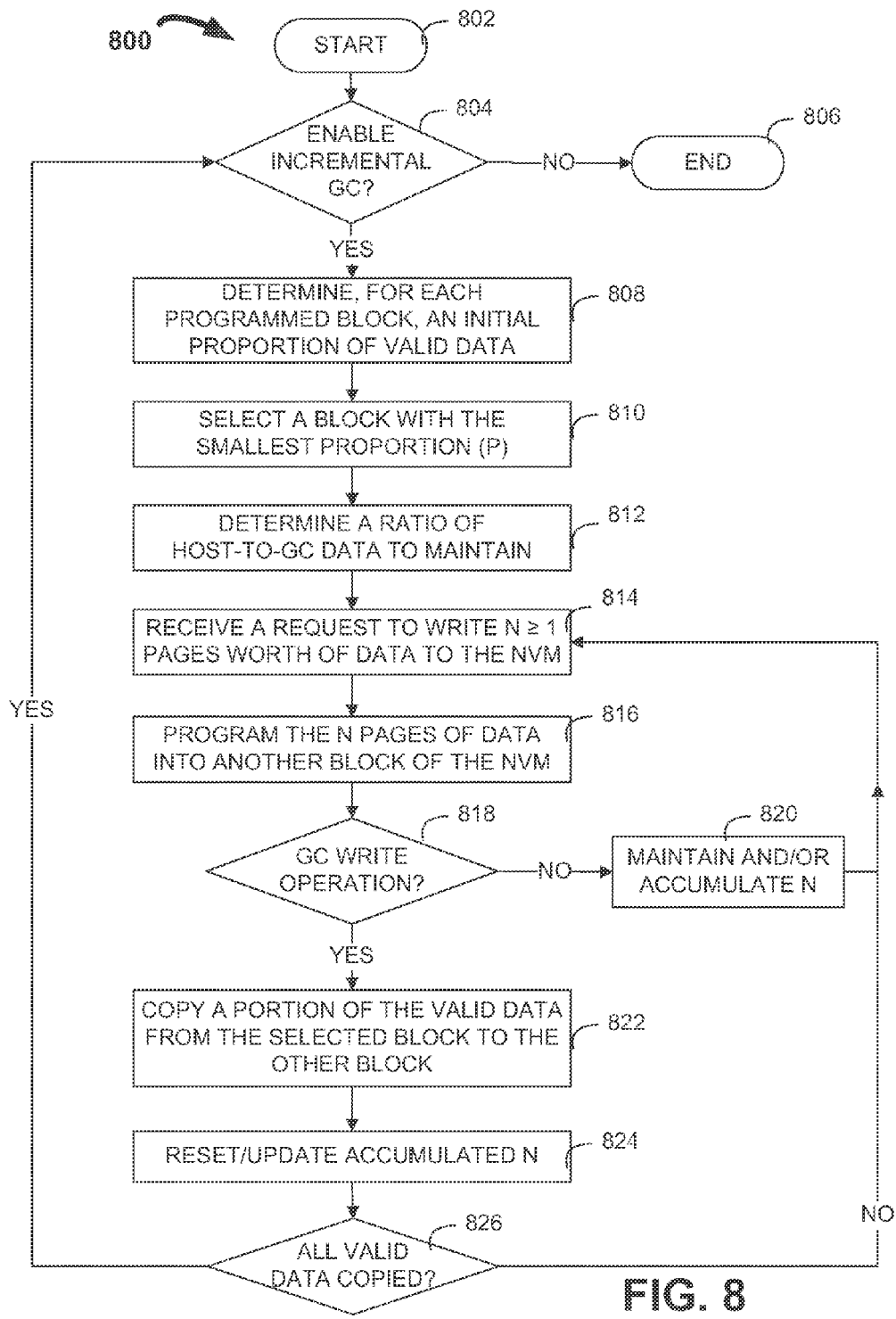
FIG. 8 is a flowchart of an illustrative process for performing incremental garbage collection in accordance with various embodiments of the invention.

Referring now to FIG. 8, a flowchart of illustrative process 800 is shown for performing incremental garbage collection.

The steps of process 800 may be executed by a memory interface for any suitable electronic device or system, such as by NVM interface 118 of electronic device 100 (FIG. 1) or NVM interface 218 of electronic device 200 (FIG. 2).

Process 800 may begin at step 802. Then, at step 804, the memory interface may determine whether to enable incremental garbage collection. In some embodiments, this may involve determining whether the number of erased blocks satisfies some criteria, such as determining whether the number of erased blocks is between a first predetermined threshold and a second predetermined threshold (e.g., the first and second thresholds discussed above in connection with FIG. 3). If not, process 800 may end at 806, and either full-on garbage collection may be performed or there may be a sufficient number of erased blocks such that garbage collection is not necessary for the time being.

If, at step 804, the memory interface determines that incremental garbage collection should be enabled, process 800 may continue to step 808. At step 808, the memory interface may determine, for each programmed block, an amount or proportion of the memory locations (e.g., pages) in the programmed block that stores valid. Then, at step 810, the memory interface may select the programmed block having the smallest proportion (P) of valid data, or the "GC block." For example, in FIG. 4, block 402 with 25% valid data may be selected as the GC block.

Continuing to step 812, the memory interface may determine a ratio of new-to-GC data to maintain when programming data into another block of the non-volatile memory (referred to sometimes as the "erased block"). The ratio may be based on the GC block's proportion of valid data, P. For example, if the initial proportion, P, equals or approximately equals 25% (as in the example of FIGS. 4-6), the ratio of new user data-to-GC data may be three-to-one. If the initial proportion, P, equals or approximately equals 75% (as in the example of FIG. 7), the ratio of new user data-to-GC data may be one-to-three. For P less than 50%, using this ratio, the memory interface may also determine a minimum amount of new user data that may be programmed before a GC programming operation is warranted (e.g., three pages in the example of FIGS. 4-6). The memory interface may determine the ratio and/or minimum amount based on any other suitable factors, such as the remaining memory locations available in the erased block or the remaining memory locations until the threshold between incremental GC and full-on GC is reached.

Following step 812, the memory interface may have completed the initial setup of incremental garbage collection for the current GC block. For example, the memory interface may have determined which block to free up for garbage collection purposes, the ratio of host-to-GC data to maintain, the minimum amount of new user data needed before a GC write becomes necessary, etc. Thus, process 800 can move to step 814, where the memory interface may receive a write request to write new user data to the non-volatile memory. The new user data may have any suitable size, and may include, for example, N pages worth of data where N≧1. The memory interface may program the N pages of data into the erased block of the non-volatile memory at step 816. The erased block may be a fully erased block or may include at least some erased memory locations (e.g., pages).

At step 818, the memory interface may determine whether to perform a GC programming operation. This determination may be based on, for example, the ratio of host-to-GC data determined at step 812 that memory interface may attempt to maintain. The determination may also be based on the number of pages N programmed at step 818 and sometimes the number of pages of data stored in response to one or more previous write requests. For the example of FIGS. 4-6, step 816 may involve determining whether at least three pages worth of data has been stored in the current memory access iteration (e.g., from the current and perhaps previous write requests). For the example of FIG. 7, or in another suitable scenario where the ratio is greater than 50%, the memory interface may perform a GC programming operation responsive to any write request during incremental garbage collection, and therefore step 818 may be skipped.

If, at step 818, the memory interface determines that a GC programming operation is not needed, process 800 may move to step 820. This may occur when, for example, the initial amount of valid data in the block selected at step 810 is less than 50% and an insufficient amount of new user data has been programmed to the non-volatile memory in the current memory access iteration to warrant a GC programming operation. At step 820, the memory interface may keep track of the amount of new user data that was programmed at step 814 along with any other new user data that has been stored in the current memory access iteration. This way, the memory interface may be able to determine, following another write request, whether a sufficient amount of new user data has been programmed to warrant another GC programming operation. As with step 818, step 818 may skipped for ratios determined at step 812 that are greater than one-to-one. Following step 820, process 800 may return to step 814, where the memory interface may receive another write request to write new user data to the non-volatile memory.

Returning to step 818, if the memory interface determines that a GC programming operation should be performed, process 800 may continue to step 822. At step 822, the memory interface may copy of portion of the valid data from the GC block selected at step 810 to the erased block of the NVM (i.e., the block in which the new user data was programmed at step 814). For example, the memory interface may read a portion of the GC block, and then copy the portion to the erased block. In some embodiments, the size of the portion may be selected based on the ratio determined at step 812, the initial proportion of valid data in the selected block, and/or on the size of the new user data programmed at step 814. In some embodiments, the size of the portion may be the smallest unit that the memory interface can program (e.g., a page for flash memory).

Then, at step 824, the memory interface may reset or update the count of new user data recently stored. This way, the memory interface can begin the next memory access iteration. In particular, for ratios of less than one-to-one determined at step 812, the memory interface can restart the count of new user data that needs to be stored during the new memory access iteration before another GC programming operation becomes warranted. For ratios of greater than 50%, like steps 818 and 820, step 822 may be skipped.

Continuing to step 826, the memory interface may determine whether all of the valid data from the GC block selected at step 810 has been copied to the erased block (or another suitable block with erased memory locations). If not, process 800 may return to step 814, where the memory interface can receive another write request and process the write request in a similar manner as described above. If instead all of the valid data has been copied, the GC block can be erased at any suitable time, and process 800 may return to step 804. This way, the memory interface can determine whether incremental garbage collection should be enabled and used to free up another programmed block for erasing.

It should be understood that process 800 of FIG. 8 is merely illustrative. Any of the steps of process 800 may be removed, modified, or combined, and any additional steps may be added, without departing from the scope of the invention.

The described embodiments of the invention are presented for the purpose of illustration and not of limitation.

What is claimed is:

1. A method of performing incremental garbage collection using a processor to free up a first block of a non-volatile memory, wherein the first block comprises memory locations storing valid data and invalid data, the method comprising:
   receiving a first write request to write first user data to the non-volatile memory; and
   in response to receiving the first write request:
      programming the first user data to a second block of the non-volatile memory; and
      copying a first portion of the valid data from the first block to the second block of the non-volatile memory.

2. The method of claim 1, wherein the copying comprises:
   reading the first portion of the valid data from the first block; and
   programming the first portion of the valid data to the second block based on the reading.

3. The method of claim 1, further comprising:
   receiving at least a second write request to write second user data to the non-volatile memory;
   in response to receiving the at least a second write request:
      programming the second user data to the second block of the non-volatile memory; and
      copying a second portion of the valid data from the first block to the second block of the non-volatile memory.

4. The method of claim 1, wherein the copying comprises:
   selecting a size of the first portion based on the size of the first user data; and
   copying the first portion to the second block based on the selected size of the first portion.

5. The method of claim 1, wherein an initial proportion of the memory locations in the first block store the valid data, and wherein the copying comprises:
   selecting a size of the first portion based on the initial proportion; and
   copying the first portion to the second block based on the selected size.

6. The method of claim 5, wherein the ratio of the size of the first user data to the selected size of the first portion of valid data is inversely proportional to the initial proportion of valid data.

7. A method of programming data to a non-volatile memory using a processor, the non-volatile memory comprising an erased block and a programmed block, wherein the programmed block stores an initial amount of valid data and an initial amount of invalid data, the method comprising:
   copying a first portion of the valid data from the programmed block into the erased block;
   programming new user data to the erased block; and
   replicating a second portion of the valid data from the programmed block into the erased block, wherein the programming and the replicating occur as part of a single memory access iteration.

8. The method of claim 7, wherein:
   the new user data comprises second new user data,
   the method further comprises programming first new user data to the erased block prior to the copying, and
   the ratio of the size of the first new user data to the size of the first portion of the valid data is substantially the same as the ratio of the size of the second new user data to the size of the second portion of the valid data.

9. The method of claim 7, further comprising receiving a write request to write the new user data to the non-volatile memory, wherein the programming is performed responsive to the write request.

10. The method of claim 7, further comprising receiving a plurality of write requests, wherein the programming is completed and the replicating is performed responsive to receiving a last of the plurality of write requests.

11. The method of claim 10, further comprising:
computing a minimum amount of user data to store before a garbage collection operation is warranted, wherein the computing is based on a ratio of the initial amount of valid data to the initial amount of invalid data; and
in response to receiving the last of the plurality of write commands, determining that the size of the new user data meets the minimum amount, wherein the replicating is performed responsive to the determining.

12. The method of claim 7, wherein
the non-volatile memory comprises flash memory,
the copying comprises copying valid data from at least a first page of the programmed block to the erased block; and
the replicating comprises copying valid data from at least a second page of the programmed block to the erased block.

13. The method of claim 7, wherein the replicating comprises:
selecting a size of the second portion based on the initial amount of valid data and the initial amount of the invalid data; and
copying the second portion based on the selected size.

14. A memory interface for performing incremental garbage collection on a non-volatile memory, the memory interface comprising:
a bus controller for communicating with the non-volatile memory; and
control circuitry configured to:
select a first block of the non-volatile memory, the first block comprising a plurality of memory locations for storing data, wherein an initial proportion of the memory locations include valid stored data; and
direct the bus controller to program a portion of the valid stored data from the first block into a second block of the non-volatile memory, wherein a size of the portion is based on the initial proportion, and wherein the size of the portion is less than a size of the initial proportion.

15. The memory interface of claim 14, wherein the control circuitry is further configured to:
determine an initial proportion of valid stored data for each of a plurality of programmed blocks in the non-volatile memory; and
select the first block of the non-volatile memory responsive to determining that the initial proportion for the first block is the smallest amongst the determined initial proportions.

16. The memory interface of claim 14, wherein the control circuitry is further configured to:
receive new user data from a file system; and
direct the bus controller to program the new user data and the first portion of the valid stored data into the second block of the non-volatile memory responsive to receiving the new user data.

17. The memory interface of claim 16, wherein the size of the portion is further based on the size of the new user data.

18. An electronic device comprising:
a non-volatile memory comprising a plurality of blocks; and
control circuitry configured to:
select a first block of the plurality of blocks, the first block storing an initial amount of valid data and an initial amount of invalid data; and
perform a plurality of memory access iterations to program data into at least a second block of the plurality of blocks, each of the memory access iterations comprising:
at least one host programming operation to program new user data to the at least the second block; and
at least one garbage collection programming operation to program a portion of the valid data from the first block to the at least the second block.

19. The electronic device of claim 18, wherein the non-volatile memory comprises a NAND-type flash memory, and wherein the control circuitry comprises a flash translation layer.

20. The electronic device of claim 18, wherein the plurality of blocks comprises a plurality of programmed blocks and at least one erased block, and wherein the control circuitry is further configured to:
determine an amount of valid data stored in each of the plurality of programmed blocks; and
select the first block from the plurality of programmed blocks for having the smallest amount of stored valid data.

21. The electronic device of claim 18, wherein the control circuitry is further configured to:
determine whether the plurality of blocks comprises less than a first threshold of erased blocks; and
program all of the valid data from the first block to the second block without performing any host programming operations in response to determining that the plurality of blocks comprises less than the first threshold of erased blocks.

22. The electronic device of claim 21, wherein the control circuitry is further configured to:
determine whether the plurality of blocks comprises less than a second threshold of erased blocks, wherein the second threshold is greater than the first threshold; and
perform the plurality of memory access iterations in response to determining that the plurality of blocks comprises less than the second threshold of erased block.

23. The electronic device of claim 18, wherein the proportion of the amount of the new user data to the amount of the portion of valid data stored in at least one of the memory access iterations is substantially the same as the proportion of the initial amount of invalid data to the initial amount of valid data in the first block.

24. The electronic device of claim 18, wherein the control circuitry is further configured to:
receive a delete request to delete data from the non-volatile memory;
determine whether completing the delete request fully invalidates at least one programmed block of the non-volatile memory; and
terminate the memory access iterations in response to determining that completing the delete request fully invalidates the at least one programmed block.

25. The electronic device of claim 18, wherein the control circuitry is further configured to:
- select a third block of the plurality of blocks after all of the valid data in the first block has been copied to the second block, the third block storing initial valid data and initial invalid data; and
- perform another plurality of memory access iterations to program data into at least a fourth block of the plurality of blocks, each of the memory access iterations comprising:
    - at least one host programming operation to program more new user data to the at least the fourth block; and
    - at least one garbage collection programming operation to program a portion of the initial valid data from the third block to the at least the fourth block.

* * * * *

UNITED STATES PATENT AND TRADEMARK OFFICE
CERTIFICATE OF CORRECTION

PATENT NO.         : 8,463,826 B2               Page 1 of 1
APPLICATION NO.    : 12/553309
DATED              : June 11, 2013
INVENTOR(S)        : Daniel J. Post et al.

It is certified that error appears in the above-identified patent and that said Letters Patent is hereby corrected as shown below:

In the Specification

In Column 1, Line 48, delete "eraseable." and insert -- erasable. --, therefor.

In Column 6, Line 2, delete "eraseable," and insert -- erasable, --, therefor.

Signed and Sealed this
Twenty-third Day of September, 2014

Michelle K. Lee
*Deputy Director of the United States Patent and Trademark Office*